No. 686,495. Patented Nov. 12, 1901.
T. J. WADDELL.
VEHICLE SHAFT.
(Application filed Nov. 12, 1900.)
(No Model.) 2 Sheets—Sheet 2.
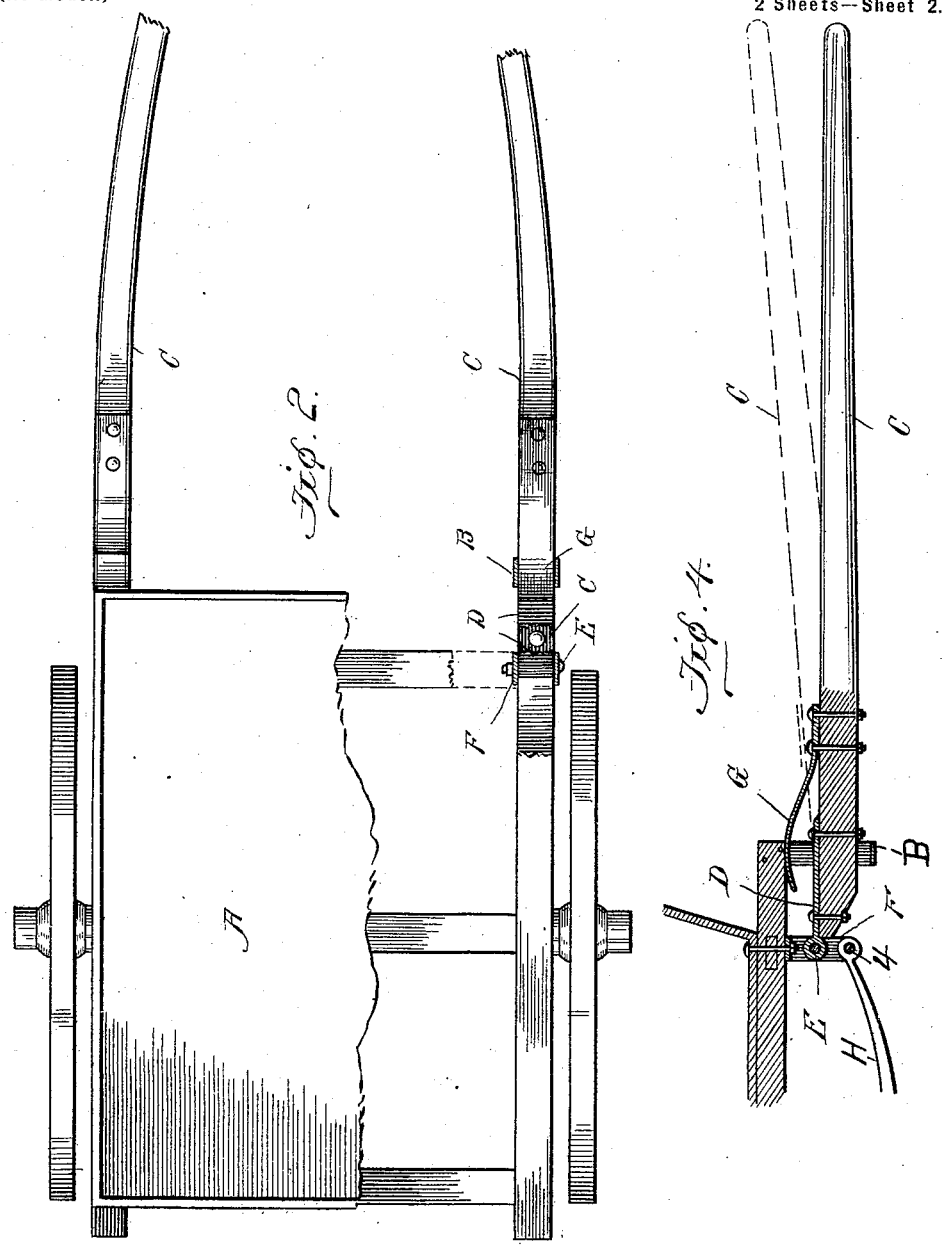
Witnesses
Thos. W. Riley,
Tom McCleary
Thomas J. Waddell, Inventor
By Victor J. Evans Attorney

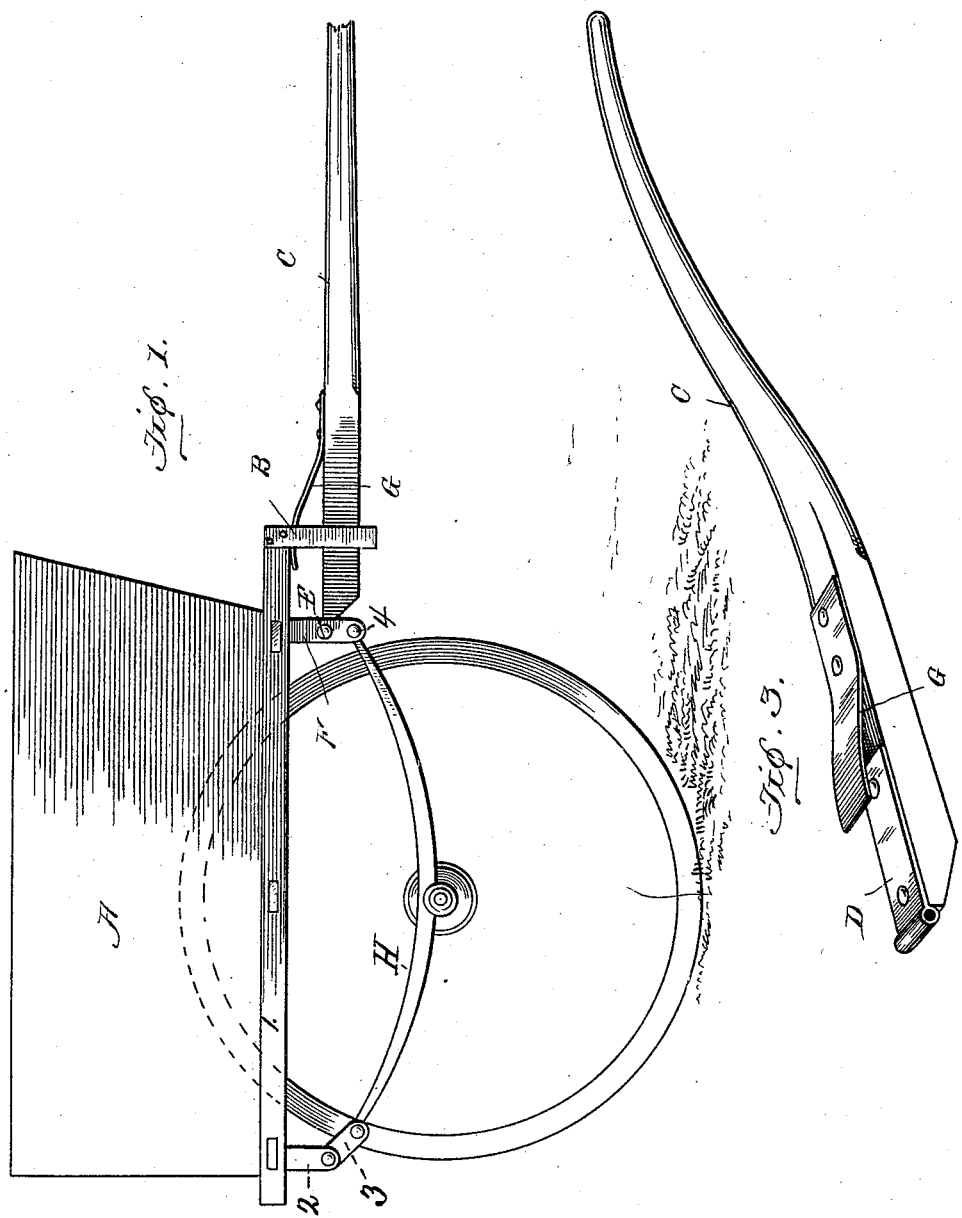

UNITED STATES PATENT OFFICE.

THOMAS J. WADDELL, OF PHILBROOK, MONTANA.

VEHICLE-SHAFT.

SPECIFICATION forming part of Letters Patent No. 686,495, dated November 12, 1901.

Application filed November 12, 1900. Serial No. 36,242. (No model.)

*To all whom it may concern:*

Be it known that I, THOMAS J. WADDELL, a citizen of the United States, residing at Philbrook, in the county of Fergus and State of Montana, have invented new and useful Improvements in Vehicle-Shafts, of which the following is a specification.

This invention relates to certain new and useful improvements in shafts for vehicles; and it has for its objects, among others, to provide a non-shaking cart-shaft having the minimum amount of elasticity, and thus doing away with the lifting motion ordinarily present and so objectionable in ordinary shafts. The shafts are not connected by cross-bar, as usual, but each is independent of the other, so as to have independent movement. Each is independently pivotally supported at its rear end, and forward of its pivot I provide a spring, which yields as the shaft moves, so that all jolt and shock are taken up and not conveyed or transmitted to the occupant of the vehicle.

The invention while herein illustrated as applied to a cart or the shafts thereof is equally as well applicable to a vehicle-tongue, and it is to be understood that the appended claims are intended to cover such application.

Other objects and advantages of the invention will hereinafter appear, and the novel features thereof will be specifically defined by the appended claim.

The invention is clearly illustrated in the accompanying drawings, which, with the letters of reference marked thereon, form a part of this specification, and in which—

Figure 1 is a side elevation showing my improvement applied to a cart. Fig. 2 is a plan view with portions broken away. Fig. 3 is a perspective view of one of the shafts detached. Fig. 4 is a detail in vertical section, showing the manner of pivoting the shaft and illustrating by dotted lines the elasticity of the shaft.

Like characters of reference indicate like parts throughout the several views.

Referring now to the details of the drawings by reference characters, A designates the body-frame, of ordinary construction, and B stirrups depending from the under side of the front thereof.

H designates the side springs of the vehicle, mounted and secured at its middle to the axle and having their rear ends yieldingly secured to the rear end portions of the side bars 1 of the body by depending links 2 3, pivotally secured together and to the end of the springs. The front ends of the springs are pivotally supported on a cross-pin 4 in the stirrups F, extending downward from the side bars, as shown in the drawings. This connection of the springs to the stirrups gives the body, and consequently the ends of the shafts, a resiliency in common with the springs in their downward movements.

C designates the shafts or tongue, having at its rear end a plate or analogous device D, by which the rear end of the shaft is pivoted on a suitable cross-pin E, supported in the hanger F, and forward of this pivot the shaft passes through and is guided in its vertical movements by the stirrup B. This stirrup serves also to prevent undue lateral motion of the shaft.

G is a spring, preferably a leaf-spring, with one end attached to the upper face of the shaft and its other end adapted to freely bear upon the under side of the side bar of the vehicle-frame, as illustrated. This spring is preferably of sufficient length to have its free end extend within the stirrup, which latter serves to keep the free end of the spring from displacement.

As will be seen, the two shafts are not connected by a cross-bar, as is usual, but each is independent of the other and each is independently pivoted and each has its own spring and acts independently of the other. By this means the one shaft is free to vibrate vertically without in the least influencing the other, and thus the shock and jolt so common in carts are entirely obviated.

It is evident that in some instances the stirrup B may be omitted or other means substituted therefor; but it is preferable that some such provision be made for the guidance of the shaft in its movements and for retaining the free end of the spring against accidental lateral displacement.

It will thus be seen that I have produced an improved means of connecting the shafts to a vehicle, and while the embodiment of my invention as herein illustrated is what I at present consider preferable I do not wish to limit myself to the exact details embraced in such structural embodiment, but reserve the right to make such changes, alterations, and modifications as properly come within the scope of the protection prayed.

What is claimed as new is—

The combination with the body of a vehicle and the side bars thereof, of depending stirrups F, secured to the side bars adjacent to their front ends, side springs having their front ends pivotally connected to cross-bars in the lower ends of the stirrups, independently-moving shafts having their rear ends pivotally connected to intermediate cross-bars on the stirrups F, shaft-guiding stirrups B depending from the front ends of the side bars, and springs having their front ends secured to the shafts and their free ends projected through the stirrups B and bearing against the front ends of the side bars, substantially as described and for the purpose set forth.

In testimony whereof I affix my signature in presence of two witnesses.

THOMAS J. WADDELL.

Witnesses:
JOHN MONTGOMERY,
MICHAEL TRACHY.